United States Patent
Tai et al.

(10) Patent No.: US 11,130,102 B2
(45) Date of Patent: Sep. 28, 2021

(54) MIXER WITH WIRELESS POWER TRANSMISSION

(71) Applicants: Cheng Chi Tai, Tainan (TW); Hsin Chang Lin, Tainan (TW); Chun Hao Lu, Tainan (TW)

(72) Inventors: Cheng Chi Tai, Tainan (TW); Hsin Chang Lin, Tainan (TW); Chia Ming Houng, Kaohsiung (TW)

(73) Assignees: Cheng Chi Tai, Tainan (TW); Hsin Chang Lin, Tainan (TW); Chun Hao Lu, Tainan (TW)

( * ) Notice: Subject to any disclaimer, the term of this patent is extended or adjusted under 35 U.S.C. 154(b) by 474 days.

(21) Appl. No.: 16/233,578

(22) Filed: Dec. 27, 2018

(65) Prior Publication Data
US 2019/0201856 A1 Jul. 4, 2019

(30) Foreign Application Priority Data
Jan. 2, 2018 (TW) .................. 107100006

(51) Int. Cl.
*B01F 9/00* (2006.01)
*H02J 50/10* (2016.01)
*B01F 15/00* (2006.01)
*B01F 9/10* (2006.01)

(52) U.S. Cl.
CPC .............. *B01F 9/0001* (2013.01); *B01F 9/10* (2013.01); *B01F 15/00538* (2013.01); *B01F 15/00993* (2013.01); *H02J 50/10* (2016.02); *B01F 2009/0061* (2013.01); *B01F 2009/0063* (2013.01); *B01F 2009/0069* (2013.01);
(Continued)

(58) Field of Classification Search
CPC .... B01F 9/0001; B01F 9/10; B01F 15/00538; B01F 15/00993; B01F 2009/0063; B01F 2009/0069; B01F 2009/0074; B01F 2009/0085; B01F 2009/0061; B01F 13/08; B01F 3/10; H02J 50/10; B01D 19/00
USPC ......................................... 366/217, 273–274
See application file for complete search history.

(56) References Cited

U.S. PATENT DOCUMENTS 4,199,866 A * 4/1980 Drury ................. B01F 11/0005
366/139
2004/0141408 A1* 7/2004 Suzuki ..................... A61C 5/68
366/139

FOREIGN PATENT DOCUMENTS

| JP | 10043567 A | * | 2/1998 | ............. B29B 7/845 |
| JP | 11309358 A | * | 11/1999 | ............. B29B 7/106 |
| JP | 2004243158 A | * | 9/2004 | ............. B29B 7/106 |

(Continued)

OTHER PUBLICATIONS

Machine translation of JP 2007-185652 A , 2007.*

*Primary Examiner* — Charles Cooley
(74) *Attorney, Agent, or Firm* — Wang Law Firm, Inc.

(57) ABSTRACT

A mixer for mixing and degassing fluids includes a revolution device having a revolution base to be driven for rotation; a first spin device connected to the revolution base of the revolution device; a first barrel connected to the first spin device to be spun by the first spin device; an transmitting coil electrically connected to a power source to generate a time-vary magnetic field; and a receiving coil connected to the revolution base of the revolution device and electrically connected to the first spin device, wherein the receiving coil rotates with the revolution base. The receiving coil receives the power from the time-vary magnetic field of the transmitting coil and produces an electromotive force to be supplied to the first spin device.

6 Claims, 5 Drawing Sheets

(52) U.S. Cl.
CPC ............... *B01F 2009/0074* (2013.01); *B01F 2009/0085* (2013.01)

(56) References Cited

FOREIGN PATENT DOCUMENTS

| | | | |
|---|---|---|---|
| JP | 2006289253 A | * | 10/2006 |
| JP | 2007185652 A | * | 7/2007 |
| TW | M395000 U1 | | 12/2010 |

* cited by examiner

MIXER WITH WIRELESS POWER TRANSMISSION

BACKGROUND OF THE INVENTION

1. Technical Field

The present invention relates to a mixer for mixing and degassing fluids, and more particularly to a mixer with a wireless power transmission.

2. Description of Related Art

Typically, a conventional mixer is equipped with a rotating device to turn a container, in which fluids are received, to mix and degas the fluids.

The conventional mixer may mix and degas adhesives as well, such as AB adhesive and UV adhesive, silver paste and tin paste, epoxy and synthetic resin, medicine and dental impression material, cosmetic materials, adhesives, pastes, inks, paints, and so on. The mixer is used in many industries, including semiconductor, packaging and testing, PDP, OLED, LCD, LED, PCB, SMT, cosmetic, dental impression, chemistry, foods, and so on.

Taiwan utility model no. M395000 disclosed a vacuum centrifugal mixer, including a base having a mounting frame, a rotating device mounted on the mounting frame, and several containers provided on the rotating device. A first transmission device is connected to the mounting frame for rotating the rotating device, and a second transmission device is connected to the mounting frame for rotating the containers. Two controllers are provided on the base to control the first and the second transmission devices respectively.

Above described vacuum centrifugal mixer is complex in structure, and needs plural controlling means and a large space. It needs to be improved.

BRIEF SUMMARY OF THE INVENTION

In view of the above, the primary objective of the present invention is to provide a mixer, which is equipped with a wireless power transmission to reduce the space for the power module and simplify the structure.

The secondary objective of the present invention is to provide a mixer, which is capable of driving the spin devices solely to meet the requirement of actual practice.

In order to achieve the objective of the present invention, a mixer for mixing and degassing fluids includes a revolution device having a revolution base to be driven for rotation; a first spin device connected to the revolution base of the revolution device; a first barrel connected to the first spin device to be spun by the first spin device; an transmitting coil electrically connected to a power source to generate a time-vary magnetic field; and a receiving coil connected to the revolution base of the revolution device and electrically connected to the first spin device, wherein the receiving coil rotates with the revolution base.

The receiving coil receives the time-vary magnetic field of the transmitting coil and produces an electromotive force to be supplied to the first spin device.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
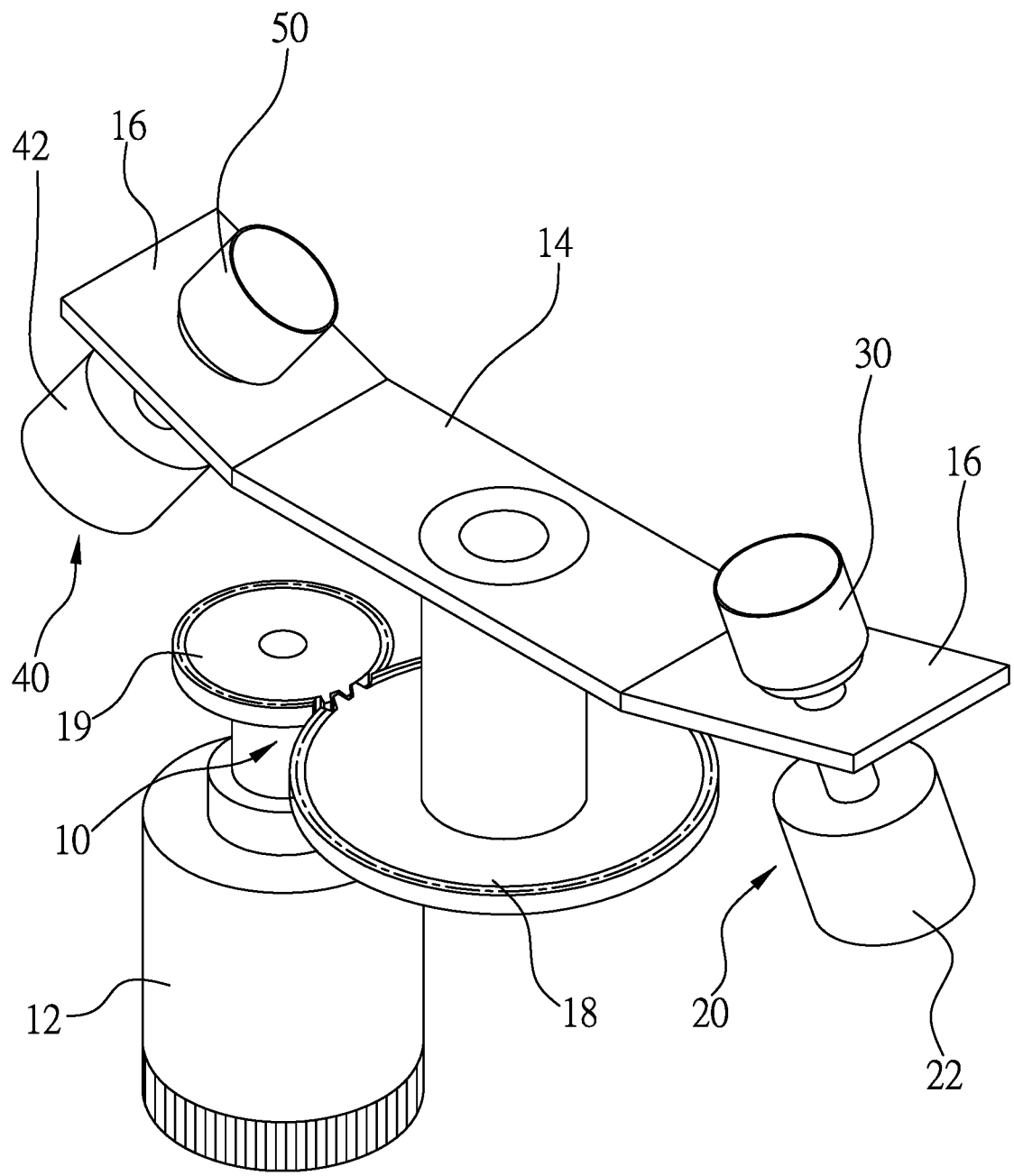
FIG. 1 is a perspective view of a first preferred embodiment of the present invention.

FIG. 1 shows a mixer for mixing and degassing fluids of the first preferred embodiment of the present invention, including a revolution device 10, a first spin device 20 connected to the revolution device 10, and a first barrel 30 connected to the first spin device 20.

The mixer further includes a second spin device 40 connected to the revolution device 10, and a second barrel 50 connected to the second spin device 40. The revolution device 10 drives both the first and the second spin devices 20, 40 and the first barrel 30 to rotate, and the first spin device 20 drives the first barrel 30 to spin while the second spin device 40 drives the second barrel 50 to spin, respectively.

In the first preferred embodiment, the revolution device 10 has a revolution motor 12 is connected to a revolution base 14 directly or indirectly to rotate the revolution base 14. The first spin device 20 includes a first spin motor 22 connected to the revolution base 14, and is connected to first barrel 30 directly or indirectly to rotate the first barrel 30. The second spin device 40 includes a second spin motor 42 connected to the revolution base 14, and is connected to second barrel 50 directly or indirectly to rotate the second barrel 50. A direction of rotation of the revolution base 14 is in reverse to directions of spin of the first and the second barrels 30, 50. In another embodiment, a direction of rotation of the revolution base 14 is the same as directions of spin of the first and the second barrels 30, 50.

Figure 2:
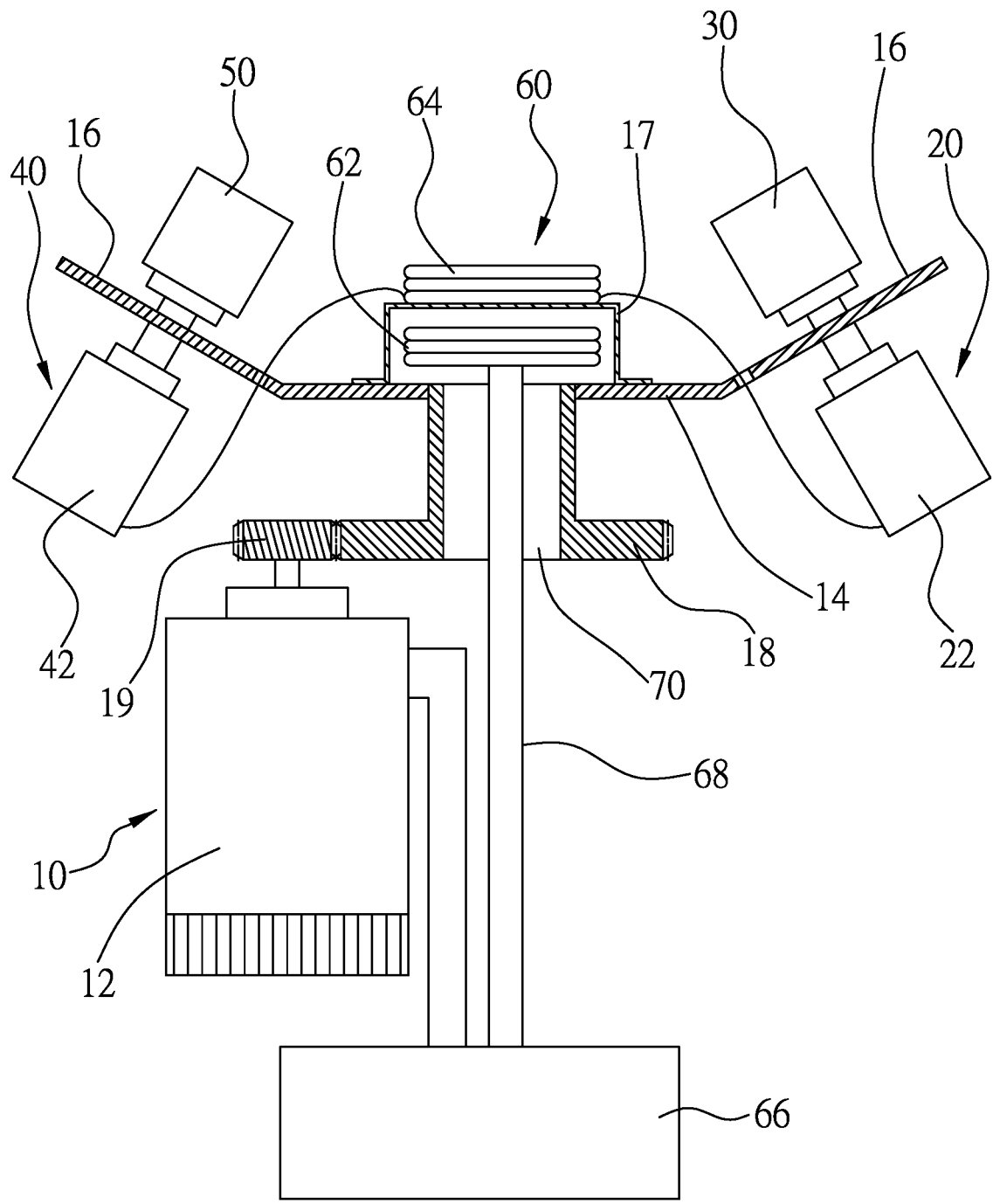
FIG. 2 is a front view of the first preferred embodiment of the present invention.

As shown in FIG. 2, the mixer further includes a power module 60 supplying the first and the second spin devices 20, 40 necessary power. The power module 60 includes a transmitting coil 62 and a receiving coil 64. The transmitting coil 62 is electrically connected to a power source 66, and the receiving coil 64 is electrically connected to the first and the second spin devices 20, 40, respectively.

The transmitting coil 62 generates a time-vary magnetic field with the power supplied by the power source 66, and the receiving coil 64 produces an electromotive force by receiving the power of the time-vary magnetic field of the transmitting coil 62 and converting it back to DC or AC current to supply the first and the second spin motors 22, 42 necessary power, so that the first and the second barrels 30, 50 are able to be driven to spin. Beside the transmitting coil 62 the power source 66 is electrically connected to the revolution motor 12 as well to drive the revolution base 14 to rotate. As a result, the first and the second barrels 30, 50 are rotated with the revolution base 14, and spun by the first and the second spin motors 22, 42 respectively.

In the first preferred embodiment, the transmitting coil 62 is mounted on the revolution base 14, and the receiving coil 64 is mounted on a coil base 17, which is connected to the revolution base 14. Both the transmitting coil 62 and the receiving coil 64 are located at a center of rotation of the revolution base 14, and are kept a predetermined distance from each other because of the coil base 17.

As shown in FIG. 1 and FIG. 2, the revolution base 14 has two inclined portions 16 at opposite sides thereof, and the first and the second spin motors 22, 42 are mounted on the inclined portions 16 respectively. As a result, rotation axes of the first and the barrels 30, 50 are not parallel to each other, and a rotation axis of the revolution base 14 is not parallel to the rotation axes of the first and the barrels 30, 50.

The revolution motor 12 is connected to a driving gear 19 while the revolution base 14 is connected to a driven gear 18, and the driven gear 18 is meshed with the driving gear 19. In another embodiment, two pulleys and a belt are provided to transmit power of the revolution motor 12 to the revolution base 14.

As shown in FIG. 2, both the transmitting coil 62 and the receiving coil 64 are above the revolution base 14. The revolution base 14 has an axle at a center of the revolution base 14, and the axle has a passage 70. A plurality of wires 68 pass through the passage 70 having opposite ends electrically connected to the power source 66 and the transmitting coil 62. As a result, the transmitting coil 62 will not rotate with the revolution base 14.

Figure 3:
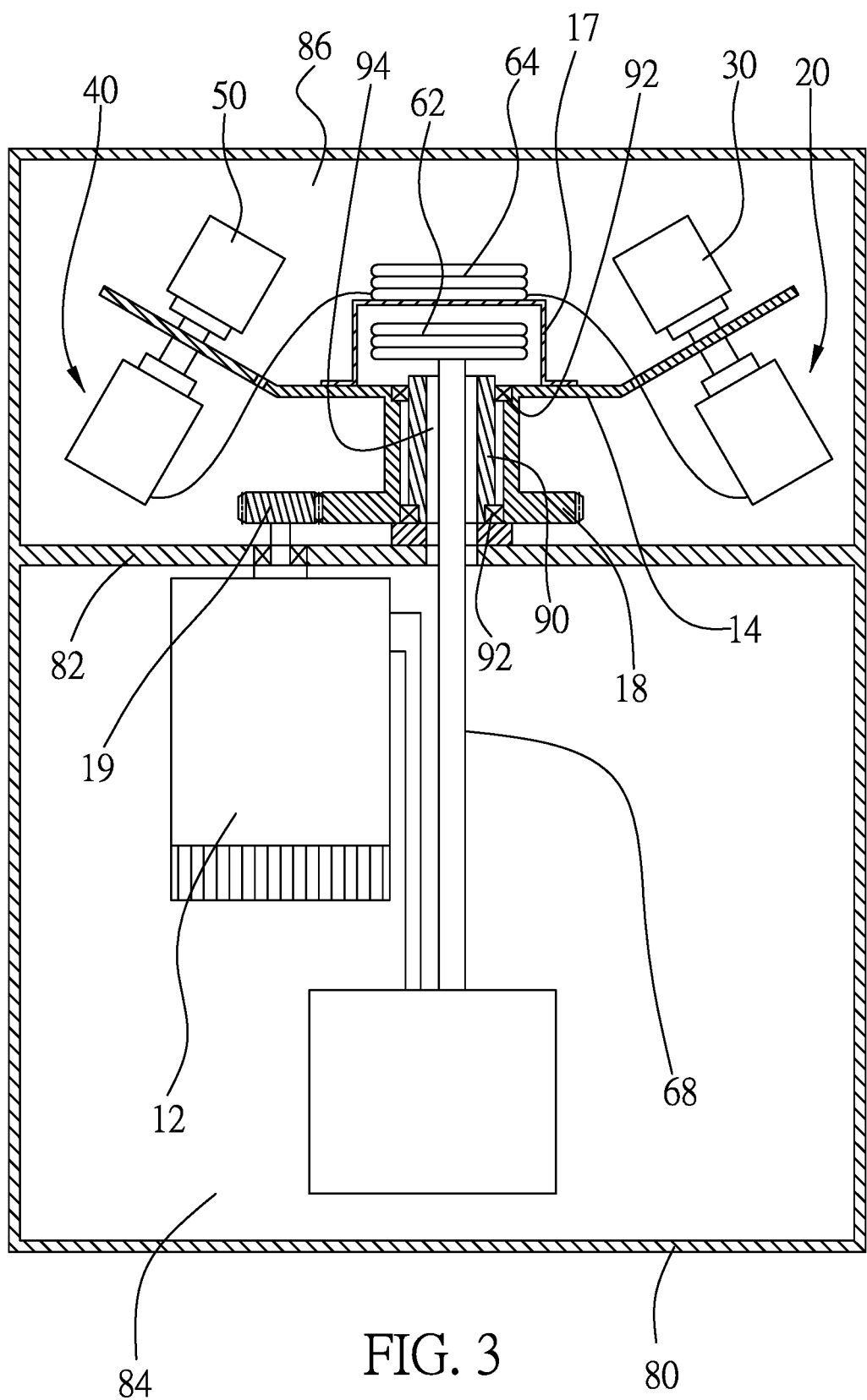
FIG. 3 is a sectional view of the first preferred embodiment of the present invention, showing the mixer in the box.

As shown in FIG. 3, the mixer further includes a box 80, in which all the elements as described above are received therein. The box 80 is provided with a board 82 therein to divide a space in the box 80 into a first space 84 and a second space 86. The revolution base 14, the first and the second spin devices 20, 40, and the emitting and the receiving coils 62, 64 are received in the second space 86 while the revolution motor 12 and the power source 66 are received in the first space 84. The driving gear 19 is received in the second space 86.

A shaft 90 is received in the second space 86, and has an end connected to the board 82. The shaft 90 is inserted into the passage 70 of the axle of the revolution base 14, and the revolution base 14 is rotatably connected to the shaft 90 via a bearing 92. The shaft 90 has a through hole 94 to pass the wires 68 therethrough. The revolution base 14 is provided with two bores for two wires passing therethrough. The wires have opposite ends connected to the receiving coil 64 and the first and the second spin motors 22, 42.

In conclusion, the mixer provides the transmitting coil 62 and the receiving coil 64 for transmitting power via wireless. It may simplify the structure and reduce the space and the cost. In addition, the revolution device 10, the first spin device 20, and the second spin device 40 are driven independently.

Figure 4:
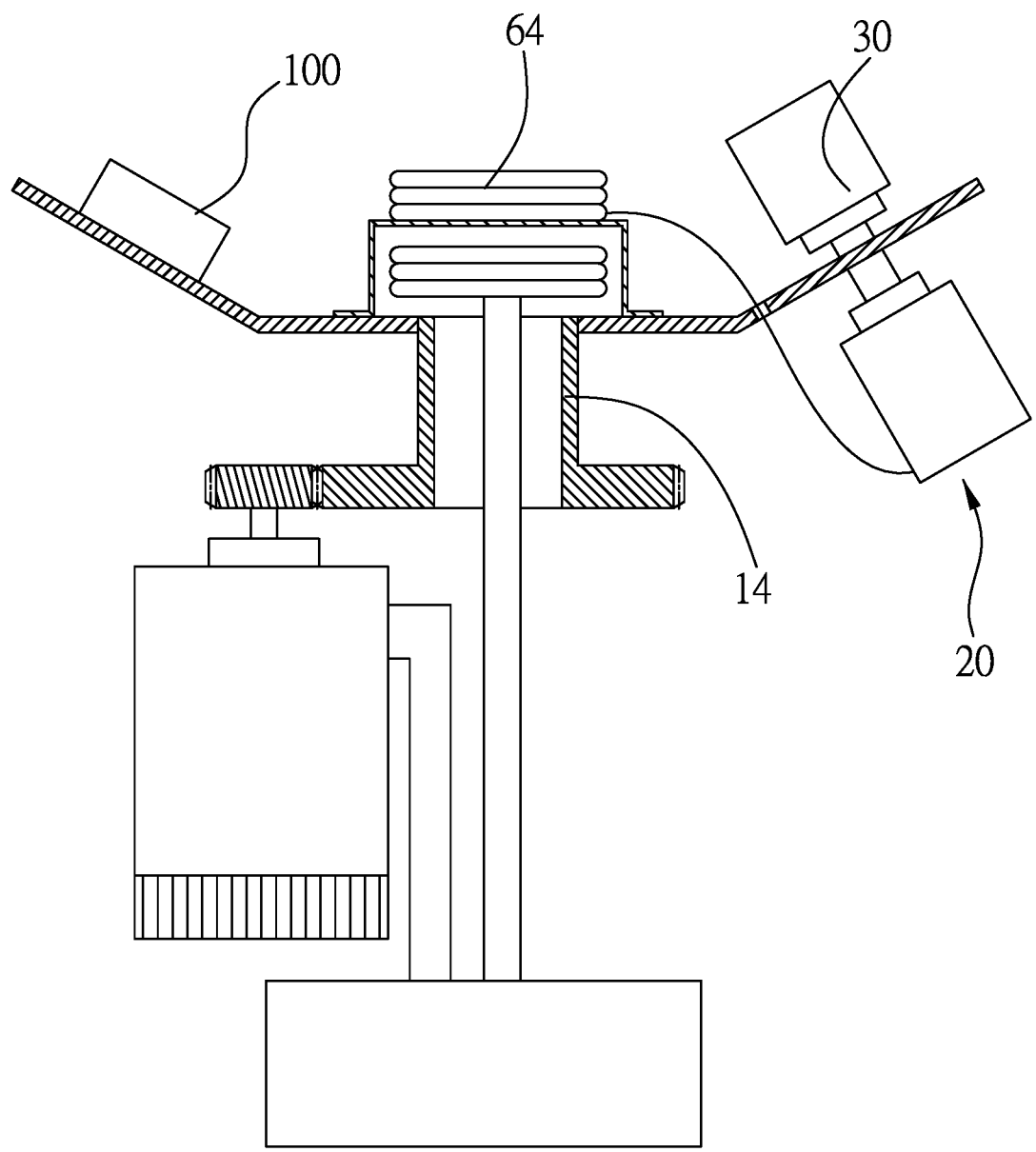
FIG. 4 is a front view of a second preferred embodiment of the present invention.

FIG. 4 shows a mixer of the second preferred embodiment of the present invention, which is the same as the mixer of the first preferred embodiment, except that a weight member 100 is provided to the revolution base 14 to replace the second spin device to balance the revolution base 14.

Figure 5:
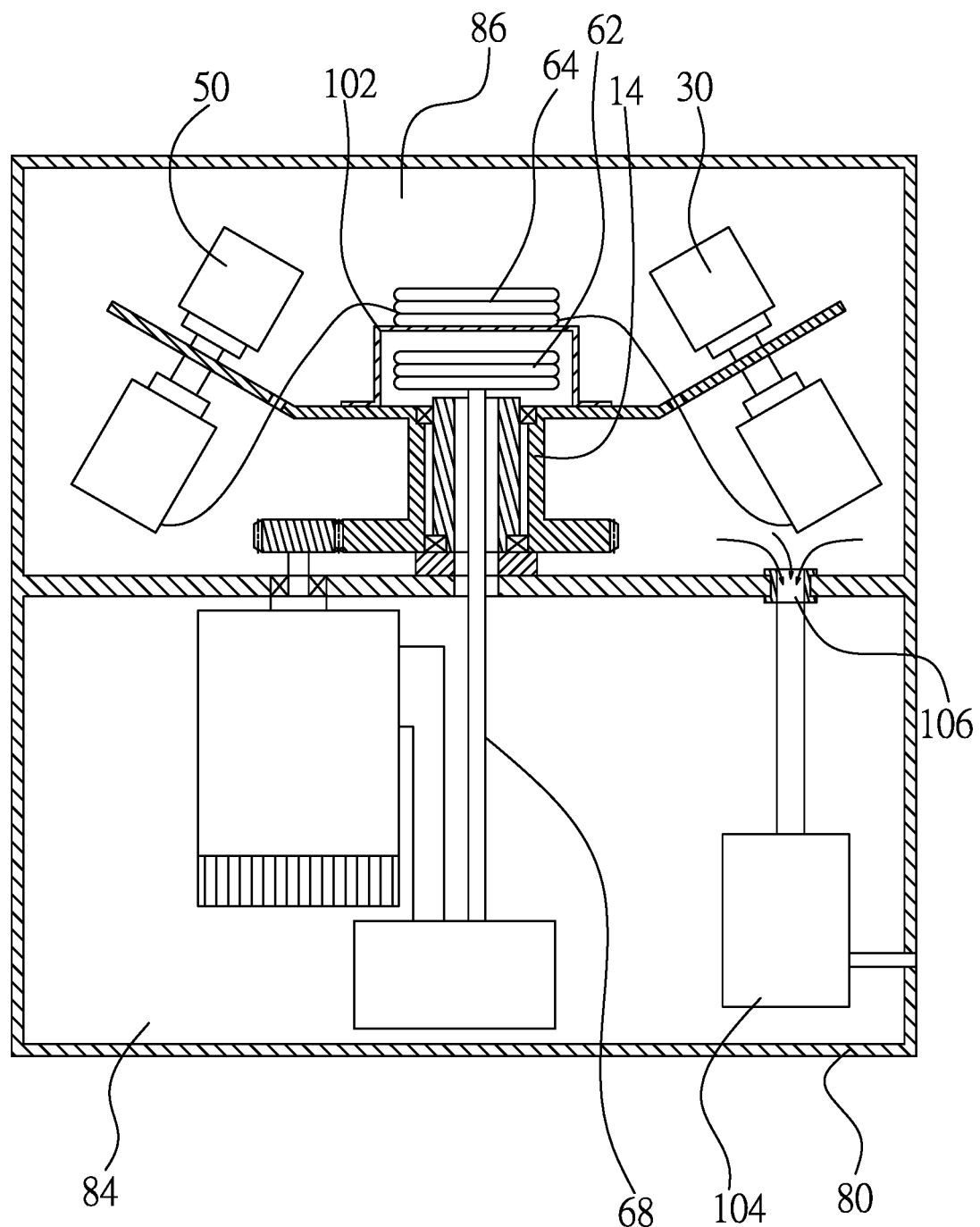
FIG. 5 is a front view of a third preferred embodiment of the present invention.

FIG. 5 shows a mixer of the third preferred embodiment of the present invention, which is the same as the mixer of the first preferred embodiment, except that a lid 102 is connected to the revolution base 14 in an airtight condition, and the transmitting coil 62 is received in the lid 102 while the receiving coil 64 is connected to an outer surface of the lid 102. Therefore, the second space 84 is isolated from the first space 82.

The third preferred embodiment further provides a vacuum device 104 received in the first space 84 of the box 80. The vacuum device 104 has a sucking pipe 106 extending into the second space 86 through the board 82 to remove gas out of the second space 86. The vacuum device 104 further has an exhausting pipe connected to outside of the box 80 to exhaust gas. As a result, fluids in the first and the second barrels 30, 50 may be mixed and degassed in a vacuum environment.

With the designs of the present invention, the mixer may have a simplified structure and a low cost. Furthermore, the mixer is easy to assembly. The independent designs of the revolution device and the spin device may prolong the life of the mixer, and provides several combinations for various uses. The wireless power transmission of the present invention may reduce the space needed for the mixer, and the size of the mixer is reduced accordingly. It also may reduce the duct when the mixer is running.

It must be pointed out that the embodiments described above are only some preferred embodiments of the present invention. All equivalent structures which employ the concepts disclosed in this specification and the appended claims should fall within the scope of the present invention.

What is claimed is:

1. A mixer, comprising:
    a revolution device having a revolution base to be driven for rotation;
    a first spin device connected to the revolution base of the revolution device;
    a first barrel connected to the first spin device to be spun by the first spin device;
    a transmitting coil electrically connected to a power source to generate a time-vary magnetic field;
    a receiving coil connected to the revolution base of the revolution device and electrically connected to the first spin device, wherein the receiving coil rotates with the revolution base;
    wherein the receiving coil receives the time-vary magnetic field of the transmitting coil and produces an electromotive force to be supplied to the first spin device
    a board, wherein the revolution device is connected to the board, and the first spin device, the transmitting coil, the receiving coil, and the first barrel are located at a side of the board;
    a box, in which the board is provided to divide a space in the box into a first space and a second space, wherein the revolution base, the first spin device, the receiving coil, and the first barrel are received in the second space;
    a vacuum device for removing gas out of the second space; and
    a lid connected to the revolution base in an airtight condition, wherein the transmitting coil is received in the lid, and the receiving coil is connected to an outer surface of the lid.

2. The mixer of claim 1, wherein the first spin device includes a first spin motor mounted on the revolution device and connected to the first barrel; the first spin motor is electrically connected to the receiving coil to be driven by the electromotive force of the receiving coil.

3. The mixer of claim 2, wherein the revolution device further includes a revolution motor connected to the revolution base to drive the revolution base to rotate, and the first spin motor is mounted on the revolution base.

4. The mixer of claim 3, wherein the revolution base has an inclined portion, on which the first spin motor is mounted, so that a rotation axis of the revolution base is not parallel to a rotation axis of the first barrel.

5. The mixer of claim 1, further comprising a second spin device connected to the revolution base of the revolution device and a second barrel connected to the second spin device to be spun by the second spin device, wherein the second spin device is electrically connected to the receiving coil to be driven by the electromotive force of the receiving coil, and the first barrel and the second barrel are located at opposite sides of the revolution base.

6. The mixer of claim 1, further comprising a weight member mounted on the revolution base to balance the first spin device and the first barrel.

\* \* \* \* \*